April 27, 1948.     G. H. KAEMMERLING     2,440,670
RESILIENT MOUNTING
Filed Sept. 1, 1944

Inventor
Gustav H Kaemmerling
By Ralph Hamma
Attorney

Patented Apr. 27, 1948

2,440,670

UNITED STATES PATENT OFFICE 2,440,670

RESILIENT MOUNTING

Gustav H. Kaemmerling, Erie, Pa., assignor to Lord Manufacturing Company, Erie, Pa., a corporation of Pennsylvania Application September 1, 1944, Serial No. 552,297

8 Claims. (Cl. 248—358)

The present invention is designed to provide in simple form a mounting readily secured to the supporting and supported members and sustaining the load through a connecting arm of resilient rubber supported to operate in shear, the rubber arm being provided with vertical openings providing a simple and effective means for securing it to the support or the load.

Features and details of the invention will appear from the specification and claims.

A preferred embodiment of the invention is illustrated in the accompanying drawings as follows:

Fig. 1 shows a side elevation, partly in section, on the line 1—1 in Fig. 2.

Fig. 2, a plan view of the mounting.

Fig. 3, a section on the line 3—3 in Fig. 1.

Fig. 4, a plan view of a sleeve or pin secured in the mounting.

1 marks a mounting arm. This has a web 2 and lateral flanges 3 at the top and bottom providing an I-shaped section for the rubber arm. The arm is preferably provided with an enlargement 4, preferably one at each end of the arm, and the enlargement is provided with a vertical perforation. If desired a hollow pin 6 may be inserted in the perforation, the pin being substantially larger than the perforation with the rubber at neutral. In other words, the rubber surrounding the perforation is stretched by the insertion of the pin.

Figure 1:
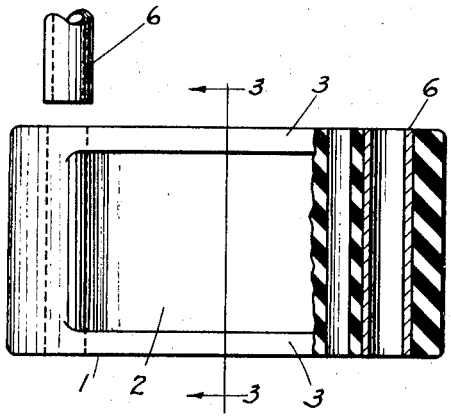
Figure 2:
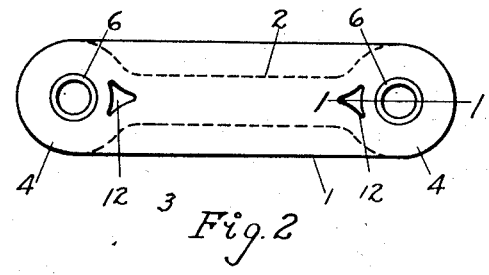
Figure 5:
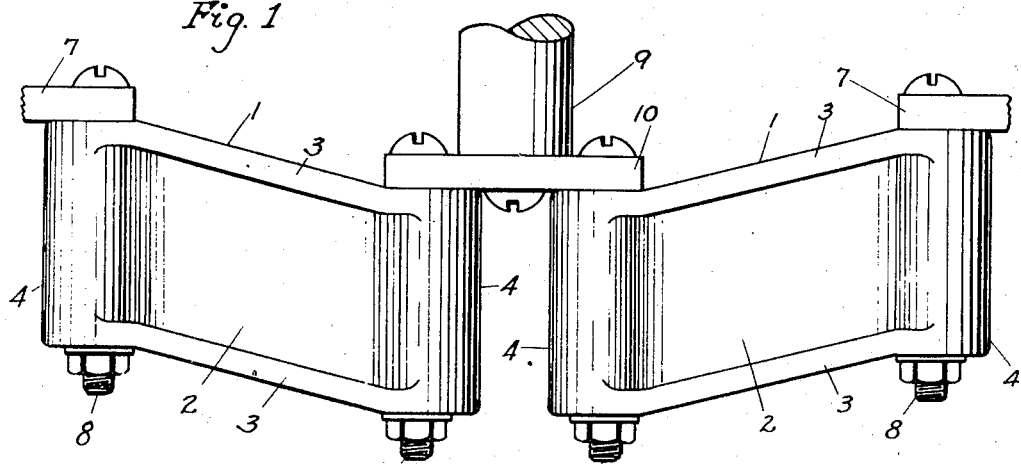
Fig. 5 illustrates a dual arrangement of said mountings.
Figure 3:
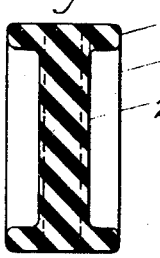
Figure 4:
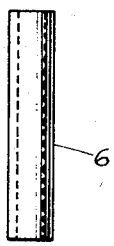

In Fig. 5 is shown a support 7 with a bolt 8 extending from the support through a pin 6. If desired under some circumstances the pin 6 may be omitted and the rubber directly attached to the bolt 8, in which case the body of the bolt within the rubber is preferably enlarged to correspond to the outside diameter of the pin 6 and the threaded end of the bolt is reduced to the inside diameter of the pin. A supported member 9 is arranged on a plate 10 and a bolt 11 extends through the plate 10 and the pin 6 in the arm.

This outwardly extending arm may, with this single arrangement, provide a convenient shear support for the load. The lateral flanges prevent the side bending of the arm under such load and also add, of course, to the shear action.

If desired, a single support such as described may be oppositely arranged, as shown in Fig. 5, in which case both arms carry the single support. This involves a slight shift in the longitudinal dimension of the rubber but this is so slight under ordinary conditions as to offer no disturbance to the shear action of the mounting.

The load is transferred from the bolt to the ends of the pin which provide a rigid clamping surface and from the outer walls of the pin to the rubber. Under severe deflection, there is a tendency for the rubber to pull away from the tension side of the pin if the localized tension exceeds the initial tension in the rubber due to insertion of the pin. This effect is decreased by triangular openings 12 which distribute the stress from the web 2 to the rubber around the pin. From one aspect the web 2 is branched and attached at spaced points to the ends 4.

Figure 6:
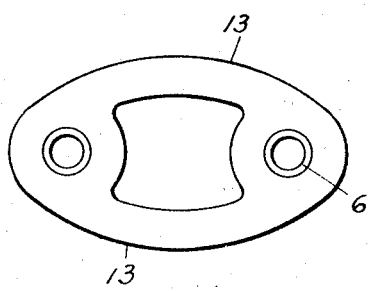
Fig. 6 is a plan view of a modification.

Another arrangement for preventing localized stress is shown in Fig. 6 where there are two arcuate webs 13 branching from opposite sides of the pins. This provides an even better distribution of stress around the pins since the load from the pins is transferred in equal amounts from opposite sides to the arms 13. The curved arms provide a softer mounting in directions transverse to the pins.

Figure 7:
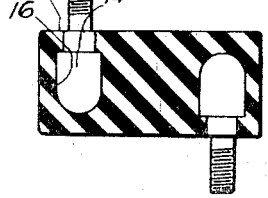
Fig. 7 is a sectional elevation of another modification.

In Fig. 7 is shown a modification in which enlarged pins 14 at the heads of studs 15 are forced into sockets 16 and held by stretching of the rubber. The pins are shorter than the sockets so the unstressed rubber at the mouths of the sockets flows over the edges of the pins providing lips 17 which hold the pins against axis displacement. The characteristics of the mounting are similar to the other forms.

In all of the mountings, the load is accommodated by shear deflection of the lateral arms and the load is transferred to the arms through the surface of the load supporting pins in contact with the rubber. For severe duty the pins may be bonded to the rubber, for example by the use of rubber cement, or by vulcanization.

Because the rubber is always in contact with the pins chafing is eliminated which increases the life of the rubber In the Fig. 7 construction, the lips 17 may be molded in the sockets 16 to more securely hold the pin in the sockets.

What I claim as new is:

1. A mounting comprising a laterally extending rubber arm free to deflect in shear, I-shaped in cross section, having a vertically extending web having an enlarged end provided with a vertically extending opening, and a load supporting pin extending into and fixed in the opening and transferring load to the arm through surface contact of the pin with the arm.

2. A mounting comprising a laterally extending rubber arm free to deflect in shear having an enlarged end provided with a vertically extending opening, and a load supporting pin extending into the opening and secured therein by the contracting gripping action of the rubber on the pin and transferring load to the arm through surface contact of the pin with the arm.

3. A mounting comprising a laterally extending rubber arm, I-shaped in cross section, having a vertically extending web having an enlarged end provided with a vertically extending opening, a vertically extending opening in the web adjacent the enlarged end whereby the load transfer to said end is distributed on opposite sides of the first opening, and a load supporting pin extending into the first opening and secured therein by the contracting gripping action of the rubber on the pin.

4. A mounting comprising a laterally extending rubber arm free to deflect in shear having ends provided with vertically extending openings, and load supporting pins extending into and fixed in the openings and transferring load to the arm through surface contact of the pins with the arm.

5. A mounting comprising a laterally extending rubber arm free to deflect in shear having enlarged ends provided with vertically extending openings, and load supporting pins extending into the openings, the pins being secured in the openings by the contracting gripping action of the rubber on the pins.

6. A rubber mounting comprising a laterally extending arm free to deflect in shear, a vertical opening in one end of the arm, a load supporting pin having a load attaching section at one end and an enlarged section of greater diameter and shorter length than said opening pressed into the opening and held therein by the gripping action of the rubber on the sides and end of said section and transferring load to the arm through surface contact of the pin with the arm.

7. A rubber mounting comprising laterally spaced ends, arms spaced apart between and connected to spaced points on said ends and free to deflect in shear, and vertical load supporting pins fixed in said ends and transferring load to the arm through surface contact of the pins with the arm.

8. A rubber mounting having an end with a vertical load supporting pin fixed therein and transferring load to the arm through surface contact of the pin with the arm, and a laterally extending arm free to deflect in shear having branched portions connected to spaced points on said end to distribute the load on said pin.

GUSTAV H. KAEMMERLING.

REFERENCES CITED

The following references are of record in the file of this patent:

UNITED STATES PATENTS

| Number | Name | Date |
|---|---|---|
| 1,401,121 | Allen | Dec. 27, 1921 |
| 1,727,609 | Kramer | Sept. 10, 1929 |
| 2,044,714 | Trott | June 16, 1936 |
| 2,239,299 | Lord | Apr. 22, 1941 |
| 2,260,022 | Gwinn | Oct. 21, 1941 |

FOREIGN PATENTS

| Number | Country | Date |
|---|---|---|
| 342,105 | Great Britain | Jan. 29, 1931 |